(12) United States Patent
Enregle

(10) Patent No.: US 11,416,199 B2
(45) Date of Patent: Aug. 16, 2022

(54) SYSTEM FOR DISPLAYING INFORMATION BY MANUAL OR AUTOMATIC SELECTION AMONG A PLURALITY OF DISPLAY MODES CLASSIFIED ACCORDING TO THEIR LEVEL OF OFF-CENTERING WITH RESPECT TO THE VEHICLE

(71) Applicants: Renault s.a.s., Boulogne-Billancourt (FR); NISSAN MOTOR CO., LTD., Yokohama (JP)

(72) Inventor: Eric Enregle, Issy-les-Moulineaux (FR)

(73) Assignees: Renault s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/264,651

(22) PCT Filed: Jul. 8, 2019

(86) PCT No.: PCT/EP2019/068262
§ 371 (c)(1),
(2) Date: Jan. 29, 2021

(87) PCT Pub. No.: WO2020/025261
PCT Pub. Date: Feb. 6, 2020

(65) Prior Publication Data
US 2021/0334059 A1    Oct. 28, 2021

(30) Foreign Application Priority Data
Aug. 1, 2018 (FR) ........................ 1857204

(51) Int. Cl.
*G06F 3/14*     (2006.01)
*B60K 35/00*    (2006.01)
(Continued)

(52) U.S. Cl.
CPC ............ *G06F 3/1423* (2013.01); *B60K 35/00* (2013.01); *G06F 3/0362* (2013.01);
(Continued)

(58) Field of Classification Search
CPC .. G06F 3/0362; G06F 3/1423; G06F 3/03547; B60K 35/00; B60K 2370/186;
(Continued)

(56) References Cited

U.S. PATENT DOCUMENTS 9,671,784 B1 *   6/2017  Dolgov ................ B60W 30/16
10,679,497 B1 *  6/2020  Konrardy ......... G08G 1/096725
(Continued)

FOREIGN PATENT DOCUMENTS

DE   10 2010 041 961 A1   4/2012
EP       1 800 959 A1     6/2007
(Continued)

OTHER PUBLICATIONS

International Search Report dated Sep. 18, 2019 in PCT/EP2019/068262 filed Jul. 8, 2019, citing documents AA-AD and AO-AS therein, 2 pages.

*Primary Examiner* — Christopher E Leiby
(74) *Attorney, Agent, or Firm* — Oblon, McClelland, Maier & Neustadt, L.L.P.

(57) ABSTRACT

A system for displaying information is intended to be incorporated in a motor vehicle including at least a dashboard, a central console, a display screen on the central façade and a front windscreen. The display system includes a manual or automatic selection device for selecting among at least three display modes each containing information, being progressively off-centre with respect to the vehicle.

9 Claims, 2 Drawing Sheets

(51) Int. Cl.
  *G06F 3/0354* (2013.01)
  *G06F 3/0362* (2013.01)
(52) U.S. Cl.
  CPC .... *G06F 3/03547* (2013.01); *B60K 2370/151* (2019.05); *B60K 2370/172* (2019.05); *B60K 2370/175* (2019.05); *B60K 2370/182* (2019.05); *B60K 2370/186* (2019.05)
(58) Field of Classification Search
  CPC ........ B60K 2370/175; B60K 2370/172; B60K 2370/182; B60K 2370/151
  See application file for complete search history.

(56) References Cited

U.S. PATENT DOCUMENTS

| | | | | |
|---|---|---|---|---|
| 11,124,186 | B1* | 9/2021 | Konrardy | G05D 1/0214 |
| 2008/0309474 | A1* | 12/2008 | Okamoto | G09G 5/022 |
| | | | | 340/462 |
| 2009/0179745 | A1 | 7/2009 | Okamoto et al. | |
| 2011/0309924 | A1* | 12/2011 | Dybalski | G06F 9/44 |
| | | | | 340/438 |
| 2013/0009460 | A1* | 1/2013 | Speach | B60R 11/02 |
| | | | | 307/9.1 |
| 2013/0222212 | A1 | 8/2013 | Lorenz et al. | |
| 2014/0306814 | A1* | 10/2014 | Ricci | G06F 16/25 |
| | | | | 340/425.5 |
| 2014/0309806 | A1* | 10/2014 | Ricci | G06F 21/32 |
| | | | | 701/1 |
| 2015/0363087 | A1* | 12/2015 | Lee | G06F 3/0482 |
| | | | | 715/771 |
| 2016/0231855 | A1* | 8/2016 | Bendewald | B60W 30/16 |
| 2016/0280234 | A1 | 9/2016 | Reilhac | |
| 2017/0185266 | A1* | 6/2017 | Dai | B60K 35/00 |
| 2017/0243485 | A1* | 8/2017 | Rubin | H04W 4/026 |
| 2019/0031027 | A1* | 1/2019 | Pala | B60K 35/00 |
| 2019/0308641 | A1* | 10/2019 | Sato | B60R 16/02 |
| 2020/0062276 | A1* | 2/2020 | Yuan | B60W 30/14 |
| 2020/0257288 | A1* | 8/2020 | Tsay | B60K 35/00 |
| 2021/0016663 | A1* | 1/2021 | Ha | B60K 35/00 |
| 2021/0258752 | A1* | 8/2021 | Burkin, Jr. | G08G 1/0112 |
| 2021/0309242 | A1* | 10/2021 | Hayakawa | G08G 1/167 |

FOREIGN PATENT DOCUMENTS

| | | |
|---|---|---|
| EP | 2 181 881 A1 | 5/2010 |
| WO | WO 2015/014894 A2 | 2/2015 |
| WO | WO 2018/024413 A1 | 2/2018 |

* cited by examiner

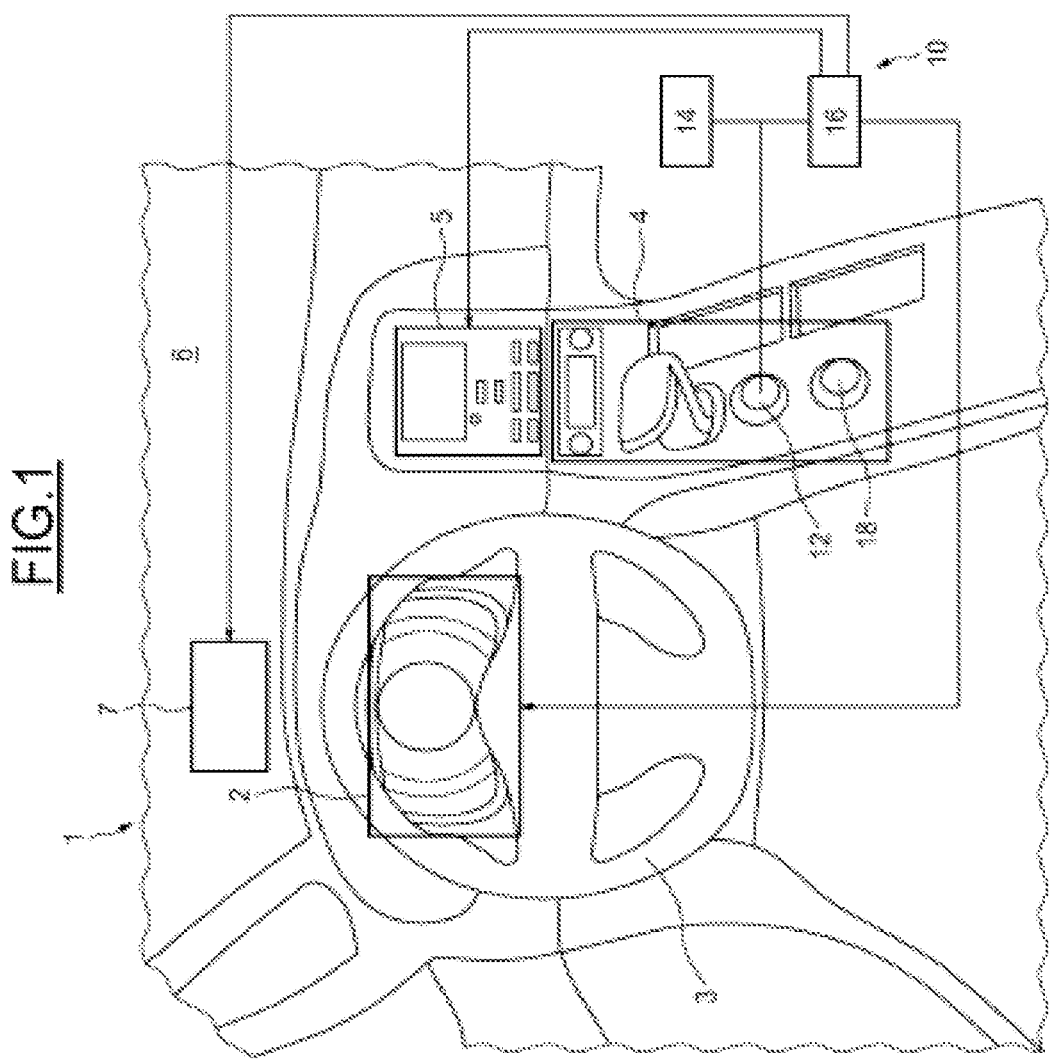

FIG.2

|  | MC_Manual | MC_Semi-auto | MC_auto |
|---|---|---|---|
| M1 "display on demand" | Vmoy, Cons_t, Cons_av, Km_total, P, C | | |
| M1 "display on demand" | ACC, LKA/LC, MC_auto | NO | NO |
| M1 "compulsory display" | NO | ACC, LKA/LC | MC_auto |
| M6 | NO | ACC, LKA/LC | MC_auto |

FIG.3

|  | MC_Manual | MC_Semi-auto | MC_auto |
|---|---|---|---|
| M2 | YES | | |
| M6 | NO | YES | YES |

FIG.4

|  | MC_Manual | MC_Semi-auto | MC_auto |
|---|---|---|---|
| M3 | Information M3 | | |
| M4 | Information M4 | | |
| M6 | NO | NO | Information M3 or Information M4 or Information M3 (M4) or Information M4 (M3) or NO |

SYSTEM FOR DISPLAYING INFORMATION BY MANUAL OR AUTOMATIC SELECTION AMONG A PLURALITY OF DISPLAY MODES CLASSIFIED ACCORDING TO THEIR LEVEL OF OFF-CENTERING WITH RESPECT TO THE VEHICLE

BACKGROUND

The present invention relates to the field of displaying information in a motor vehicle, and in particular to the technical means used to generate such a display.

Nowadays, motor vehicles propose to display multiple information, randomly and independently of the driving mode, either on the dashboard or on the central panel, or else on the head-up display, HUD in acronym form.

There is thus a need to improve the information display systems in a motor vehicle.

BRIEF SUMMARY

The aim of the invention is therefore to attract the attention, in particular of the driver, to information of various types, classified by order of off-centering with respect to the vehicle, and to allow access to this information depending on the driving mode, such as for example the manual driving mode, the semi-autonomous driving mode or the autonomous driving mode.

"Semi-autonomous driving" is understood to mean driving automated by activating for example what are called lane keeping assist systems, LKA in acronym form, that make it possible to automatically reposition the vehicle in its lane, what are called lane centering assist systems, LCA in acronym form, that make it possible to keep the vehicle in its lane, or else what are called adaptive cruise control systems, ACC in acronym form, that are capable of adjusting the speed and automatically keeping a safe distance from the vehicle in front.

The subject of the present invention is an information display system intended to be integrated into a motor vehicle comprising at least a dashboard, a central console, a display screen on the central panel and a front windscreen.

Said display system comprises a selection device for manually or automatically selecting from among at least three display modes each containing information having progressive levels of off-centering with respect to the vehicle. "Progressive off-centering" is understood to mean the spacing of the information from the vehicle and from the drive, starting from information centered on the vehicle and/or the drive up to completely off-centered information, that is to say decorrelated from the vehicle and its movement.

More precisely, the progressive off-centering is as follows, starting from the most centered information to the most off-centered information: information about the parameters of the vehicle, information about the driving context in which the vehicle is traveling, information about the connection with others in the nearby surroundings, information about the discovery of the area in the nearby surroundings, and extended connection information decorrelated from the nearby driving surroundings.

The information is thus classified by its degree of off-centering with respect to the vehicle.

The selection device for manually or automatically selecting from among the at least three display modes may be a rotary button located on the central console. As a variant, a rotary button located on the dashboard or else located on the windscreen wiper stalk or indicator stalk could be provided.

Advantageously, the system comprises a verification module for verifying the activated driving mode, such as for example the manual driving mode, the semi-autonomous driving mode or the autonomous driving mode.

For example, the system comprises a transmission module for transmitting the display on at least one display device depending on the selected display mode and on the activated driving mode.

The display device may comprise the dashboard of the vehicle and/or the central panel of the vehicle, and/or a head-up display, HUD in acronym form, on the windscreen when this is available.

A moving screen for displaying information could also be provided.

Advantageously, the system comprises a device configured so as to scroll through the information contained in the selected display mode.

Said device is an additional button located on the central console. The information contained in the first display mode is scrolled through by pressing the button or rotating said button. As a variant, there could be provision for said device to be integrated into the selection device for selecting the display mode, for example by rotating it, or else integrated into the windscreen wiper or indicator control stalks.

For example, one of the at least three display modes is a display mode centered on the vehicle and comprising information about the parameters of the vehicle contained in the list comprising at least average driving speed, instantaneous consumption, average consumption, total mileage, tire pressure, the activated or non-activated state of the driving assistance systems, driving mode, the state of the various sensors, such as for example radars, lasers, cameras or ultrasound sensors present on the vehicle, said information in the display mode centered on the vehicle being displayed on the dashboard only upon request and being displayed in succession.

Said information in the display mode centered on the vehicle may be duplicated on the head-up display.

The tire pressure information and the information about the state of the various sensors may be displayed in detail on the central panel.

Advantageously, one of the at least three display modes is a display mode centered on the nearby surroundings of the vehicle and comprising information about the perception of the driving surroundings of the vehicle, contained in the list comprising at least lane detection, lane position, detection of vehicles close to the motor vehicle, the change in vehicle-to-vehicle distance as a function of the driving speed of the motor vehicle, projected trajectory, said information in the display mode centered on the nearby surroundings of the vehicle being displayed on the dashboard by triggering said display mode.

Said information in said display mode may be duplicated on the head-up display.

Advantageously, one of the at least three display modes is a display mode centered on the connection with others and comprising information about the connection with others in nearby surroundings of the vehicle and a display mode centered on points of interest and comprising information about points of interest located in the nearby surroundings of the vehicle, the information in the display modes centered respectively on the connection with others and on points of interest are displayed on the central screen and are accessible by triggering the corresponding display mode.

The information in the display mode centered on the connection with others comprises, without limitation, any information for establishing a link with a user near the motor vehicle, in particular with users subscribed to social networks to which the driver has subscribed and who are either taking the same route at the same time or are going to the same destination at the same time or are taking a break at the same location and at the same time.

The information in the display mode centered on points of interest comprises, without limitation, any information that off-centers the vehicle and others in the nearby surroundings of the vehicle, in particular points of interest such as natural sites, historic sites, fauna, flora, local anecdotes, etc.

Advantageously, one of the at least three display modes is an automatic display mode configured so as to automatically adapt the content of the display to the selected driving mode and may be customized by the user, said automatic display mode not being able to be activated in manual driving mode.

The selection device for selecting the automatic display mode may be integrated into the selection device for selecting the previous display modes.

However, there could be provision for the selection device for selecting the automatic mode to be a mechanical or touch button on the central screen, separate from the selection device for selecting the previous display modes.

When the automatic display mode is selected, the information in the display modes centered respectively on the connection with others and on points of interest is displayed on the central screen depending on the preferences provided beforehand by the user.

Thus, either only the information in the display mode centered on the connection with others is displayed, or only the information in the mode centered on points of interest is displayed, or the information in the display mode centered on the connection with others is displayed as a priority, and may be, according to one non-limiting embodiment, interrupted by pop-up windows containing the information in the display mode centered on points of interest, in order to provide an alert about the proximity of a point of interest. According to one variant, there could be provision for the information in said display mode centered on points of interest to be displayed as a priority, interrupted by pop-up windows containing the information in the display mode centered on the connection with others, in order to provide an alert about the proximity of a community. The user may also make provision not to display the information in said display modes when selecting the automatic mode. In this case, the central display screen will display conventional information, such as radio, temperature or else navigation information.

Advantageously, one of the at least three display modes is a display mode off-centered from the vehicle comprising connection information independent of the journey being taken. The information in the off-centered display mode is displayed on the central screen and is accessible by triggering said display mode depending on preferences provided beforehand by the user. For example, the information in the off-centered display mode may be interrupted by pop-up windows relating to the information in the display modes centered respectively on the connection with others and points of interest. The information in this off-centered display mode is not available when the automatic display mode is selected.

BRIEF DESCRIPTION OF THE DRAWINGS

Other aims, features and advantages of the invention will become apparent on reading the following description, given solely by way of non-limiting example and with reference to the appended drawings, in which:

FIG. 1 schematically shows an information display system 10 of a motor vehicle according to the invention;

FIG. 2 is a table showing the display of information in the first mode M1 as a function of the driving mode MC and of the first or sixth selected display mode M1 or M6;

FIG. 3 is a table showing the display of information in the second mode M2 as a function of the driving mode MC and of the second or sixth selected display mode M2 or M6; and FIG. 4 is a table showing the display of information in the third and fourth mode M3, M4 as a function of the driving mode MC and of the third, fourth or sixth selected display mode M3, M4, M6.

DETAILED DESCRIPTION

FIG. 1 shows, highly schematically, an information display system 10 intended to be integrated into a motor vehicle 1, part of the passenger compartment of which is shown in FIG. 1. The motor vehicle 1 comprises a dashboard 2, located behind a steering wheel 3, a central console 4, a display screen on the front panel 5, and a front windscreen 6.

The display system 10 comprises a selection device 12, for example able to be activated manually or automatically, for selecting from among a plurality of display modes M each containing information having progressive degrees of off-centering, starting from the display mode containing the most centered information with respect to the vehicle and its nearby surroundings to the display mode containing the most off-centered, that is to say distant, information with respect to the vehicle and its nearby surroundings.

The display system 10 furthermore comprises a verification module 14 for verifying the activated driving mode MC, such as for example the manual driving mode MC_manual, the semi-autonomous driving mode MC_semiauto or the autonomous driving mode MC_auto.

The display system 10 comprises a transmission module 16 for transmitting the display on one or more display devices 2, 5, 7 depending on the selected display mode M and on the activated driving mode MC.

The display devices comprise the dashboard 2 of the vehicle, the central panel 5 of the vehicle, or else the head-up display 7, HUD in acronym form, on the windscreen 6 when this is available.

The display system 10 also comprises a device 18 configured as so to scroll through the information contained in the selected display mode M.

As illustrated, the selection device 12, able to be activated for example manually or automatically, for selecting from among the plurality of display modes M is a rotary button located on the central console 4. As a variant, there could be provision for a rotary button located on the dashboard, or else located on the windscreen wiper stalk or indicator stalk.

The plurality of display modes M comprises six display modes M1 to M6. Each display mode M corresponds to an information level, from the most centered on the vehicle to the most off-centered, in the following gradation:

The first display mode M1 corresponds to the mode the most centered on the vehicle and comprises information about the parameters of the vehicle.

The parameters of the vehicle comprise, without limitation, average driving speed Vav, instantaneous consumption Cons_t, average consumption Cons_av, total mileage Km_total, tire pressure P, the activated or non-activated state of the driving assistance systems, such as for example the what are called lane keeping assist systems, LKA in acronym form, what are called lane centering assist systems, LCA in acronym form, or else what are called adaptive cruise control systems, ACC in acronym form. The parameters of the vehicle also comprise the state of the various sensors C, for example the radars, the lasers, the cameras or the ultrasound sensors present in the vehicle.

The information in the first display mode M1 is displayed on the dashboard 2 and may be duplicated on the head-up display 7. The tire pressure information and the information about the state of the various sensors may be displayed in detail on the central panel 5.

The table illustrated in FIG. 2 shows the display of the information in the mode M1 as a function of the driving mode MC and of the selected display mode M1 or M6.

The information about the parameters of the vehicle is accessible only upon request, and is displayed consecutively, that is to say in succession, following the triggering of the device 18 configured so as to scroll through the information contained in the selected display mode M. As illustrated, said device 18 is an additional button located on the central console 4. The information contained in the display mode M is scrolled through by pressing the button or rotating said button. As a variant, there could be provision for said device 18 to be integrated into the selection device 12 for selecting the display mode, for example by rotating it, or else integrated into the windscreen wiper or indicator control stalks.

In the semi-autonomous driving mode MC_semiauto, the activated state of the driving assistance systems, such as the lane keeping assist system, LKA in acronym form, the lane centering assist system, LCA in acronym form, and the adaptive cruise control system, ACC in acronym form, are displayed continually, whether or not a display mode M, whatever this may be, is selected.

In the autonomous driving mode MC_auto, the activated state of the autonomous driving mode MC_auto is displayed continually, whether or not a display mode M, whatever this may be, is selected.

When the automatic mode M6 is selected, from among the information in the mode M1, only the activated state of the driving assistance systems or of the autonomous driving mode MC_auto is displayed, respectively in the semi-autonomous driving mode MC_semiauto and in the autonomous driving mode MC_auto.

There are thus two areas dedicated to the display, specifically a fixed area and a moving area.

The second display mode M2 corresponds to the mode centered on the nearby surroundings of the vehicle and comprises information about the perception of the driving surroundings of the vehicle.

The information about the perception of the driving surroundings of the vehicle comprises, without limitation, lane detection, lane position, detection of vehicles close to the motor vehicle, the change in vehicle-to-vehicle distance as a function of the driving speed of the motor vehicle, projected trajectory.

The information in the second display mode M2 is displayed on the dashboard 2 and may be duplicated on the head-up display 7.

The table illustrated in FIG. 3 shows the display of the information in the mode M2 as a function of the driving mode MC and of the selected display mode M2 or M6.

The information in the second display mode M2 is accessible by triggering the display mode M2, whatever the driving mode MC may be, or by triggering the display mode M6 in the driving mode MC_semiauto or MC_auto.

The third display mode M3 corresponds to the mode centered on the connection with others and comprises information about the connection with others in nearby surroundings of the vehicle, comprising, without limitation, any information for establishing a link with a user near the motor vehicle, in particular with users subscribed to social networks to which the driver has subscribed and who are either taking the same route at the same time or are going to the same destination at the same time or are taking a break at the same location and at the same time.

The information in the third display mode M3 is displayed on the central screen 5 and is accessible by triggering the display mode M3.

The fourth display mode M4 corresponds to the mode centered on points of interest and comprises information about points of interest located in the nearby surroundings of the vehicle comprising, without limitation, any information that off-centers the vehicle and others in the nearby surroundings of the vehicle, in particular points of interest such as natural sites, historic sites, fauna, flora, local anecdotes, etc.

The information in the fourth display mode M4 is displayed on the central screen 5 and is accessible by triggering the display mode M4. It may be coupled for example to an audio guide that may be selected by the user.

The table illustrated in FIG. 4 shows the display of the information in modes M3 and M4 as a function of the driving mode MC and of the selected display mode M3, M4 or M6.

When the mode M6 is selected, the information in the third and fourth modes M3, M4 is displayed on the central screen 5 depending on the preferences provided beforehand by the user.

Thus, either only the information in the third mode M3 is displayed, or only the information in the fourth mode M4 is displayed, or the information in the third mode M3 is displayed as a priority, interrupted by pop-up windows containing the information in the fourth mode M4, in order to provide an alert about the proximity of a point of interest, or the information in the fourth mode M4 is displayed as a priority, interrupted by pop-up windows containing the information in the third mode M3, in order to provide an alert about the proximity of a community. The user may also make provision not to display anything when selecting the automatic mode M6.

The fifth display mode M5 corresponds to the mode most off-centered from the vehicle and from its nearby surroundings and comprises connection information independent of the journey being taken.

The information in the fifth display mode M5 is displayed on the central screen 5 and is accessible by triggering the display mode M5 depending on preferences provided beforehand by the user. For example, the information in the fifth mode M5 may be interrupted by pop-up windows relating to the information in the third and fourth mode M3, M4. The information in this fifth mode M5 is not available when the sixth display mode M6 is selected.

The sixth display mode M6 corresponds to an automatic mode. This sixth mode is not able to be activated in manual driving mode. This automatic display mode M6 is configured so as to automatically adapt the content of the display to the selected driving mode MC and may be customized by the user.

The selection device for selecting the sixth automatic mode M6 may be integrated into the selection device 12 for selecting the display modes M1 to M5. However, there could be provision for the selection device for selecting the automatic mode to be a mechanical or touch button on the central screen, separate from the selection device 12 for selecting the display modes M1 to M5.

When information is displayed on the central panel on the display 5, it may occupy for example 90% of the display area. When new information is displayed, it takes the place of the previous information, which will then shrink, for example into a selection banner, so as to occupy for example 10% of the display area.

As a variant, the information could be displayed on a moving screen instead of the central screen 5 of the motor vehicle.

By virtue of the display system according to the invention, the information display is off-centered from the driver as the information is off-centered from the vehicle and its surroundings.

The invention claimed is:

1. An information display system configured to be integrated into a motor vehicle comprising at least a dashboard, a central console, a display screen on the central panel and a front windscreen, said display system comprising:
   a selection device configured to manually or automatically select from among at least three display modes including a first display mode, a second display mode, and a third display mode, each of the three display modes containing information having progressive levels of off-centering with respect to the vehicle such that the information in the first display mode does not overlap with the information in the second display mode, the information in the second display mode does not overlap with the information in the third display mode, and the information in the first display mode does not overlap with the information in the third display;
   a verification module configured to verify the activated driving mode, said driving mode being chosen from among a manual driving mode, a semi-autonomous driving mode, and an autonomous driving mode; and
   a transmission module configured to transmit the display on at least one display device, depending on the selected display mode and on the activated driving mode such that, when the first display mode is selected, a first subset of the information in the first display mode is displayed when the manual driving mode is chosen, a second subset of the information in the first display mode is displayed when the semi-autonomous driving mode is chosen, and a third subset of the information in the first display mode is displayed when the autonomous driving mode is chosen, and the first subset, the second subset, and the third subset are not identical to one another,
   wherein the transmission module transmits the display on the at least one display device such that, when the second display mode is selected, a first subset of the information in the second display mode is displayed when the manual driving mode is chosen, a second subset of the information in the second display mode is displayed when the semi-autonomous driving mode is chosen, and a third subset of the information in the second display mode is displayed when the autonomous driving mode is chosen, and the first subset, the second subset, and the third subset of the information in the second display are identical to one another.

2. The system as claimed in claim 1, wherein the display device comprises at least one of the dashboard of the vehicle, the central panel of the vehicle, and a head-up display on the windscreen.

3. The system as claimed in claim 1, further comprising a device configured so as to scroll through the information contained in the selected display mode.

4. The system as claimed in claim 3, wherein one of the at least three display modes is a display mode centered on the vehicle and comprising information about the parameters of the vehicle contained in a list comprising at least average driving speed, instantaneous consumption, average consumption, total mileage, tire pressure, the activated or non-activated state of the driving assistance systems, driving mode, a state of various sensors present on the vehicle, said information in the display mode centered on the vehicle being displayed on the dashboard only upon request and being displayed in succession by the device configured so as to scroll through the information.

5. The system as claimed in claim 1, wherein one of the at least three display modes is a display mode centered on the nearby surroundings of the vehicle and comprising information about the perception of the driving surroundings of the vehicle, contained in a list comprising at least lane detection, lane position, detection of vehicles close to the motor vehicle, a change in vehicle-to-vehicle distance as a function of the driving speed of the motor vehicle, projected trajectory, said information in the display mode centered on the nearby surroundings of the vehicle being displayed on the dashboard by triggering the second display mode.

6. The system as claimed in claim 1, wherein one of the at least three display modes is a display mode centered on the connection with others and comprising information about the connection with others in nearby surroundings of the vehicle and a display mode centered on points of interest and comprising information about points of interest located in the nearby surroundings of the vehicle, the information in said display modes being displayed on the central screen and being accessible by triggering the corresponding display mode.

7. The system as claimed in claim 1, wherein one of the at least three display modes is an automatic display mode configured so as to automatically adapt the content of the display to the selected driving mode and configured to be customized by the user, said automatic display mode not being configured to be activated in manual driving mode.

8. The system as claimed in claim 7, wherein the selection device that selects the automatic display mode is a mechanical or touch button on the central screen, separate from the selection device that selects the previous display modes.

9. The system as claimed in claim 7, wherein the transmission module transmits the display on the at least one display device such that, when the third display mode is selected, a first subset of the information in the third display mode is displayed when the manual driving mode is chosen, a second subset of the information in the third display mode is displayed when the semi-autonomous driving mode is chosen, and a third subset of the information in the third display mode is displayed when the autonomous driving mode is chosen, and the first subset, the second subset, and the third subset of the information in the third display are identical to one another.

* * * * *